United States Patent [19]

Smith et al.

[11] 3,725,349
[45] Apr. 3, 1973

[54] PHENOL-FORMALDEHYDE ADHESIVE RESINS CONTAINING POLY($C_3$–$C_4$ ALKYLENEOXY)GLYCOLS

[75] Inventors: Harry A. Smith; Erwin H. Kobel, both of Midland, Mich.

[73] Assignee: The Dow Chemical Company, Midland, Mich.

[22] Filed: June 12, 1972

[21] Appl. No.: 261,740

Related U.S. Application Data

[63] Continuation-in-part of Ser. No. 100,502, Dec. 21, 1970, abandoned.

[52] U.S. Cl. ................260/58, 117/148, 117/161 L, 161/262, 260/17.2, 260/29.3, 260/38
[51] Int. Cl. ................................................C08g 5/18
[58] Field of Search........................................260/58

[56] References Cited

UNITED STATES PATENTS

| 1,952,243 | 3/1934 | Frick | 260/58 |
| 2,902,470 | 9/1959 | Kress | 260/47 |
| 3,025,255 | 3/1962 | Lambuth | 260/29.3 |
| 3,156,670 | 11/1964 | Soldatos | 260/58 |
| 3,661,814 | 5/1972 | Smith et al | 260/58 X |
| 3,663,481 | 5/1972 | Freeman et al | 260/14 |

*Primary Examiner*—Howard E. Schain
*Attorney*—William M. Yates et al.

[57] ABSTRACT

Improved phenol-formaldehyde adhesive resins are obtained by premixing with aqueous formaldehyde about 0.3-1.5 parts per part formaldehyde of a poly($C_3$–$C_4$ alkyleneoxy)glycol of Formula I:

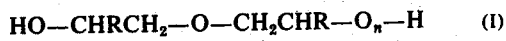

$$HO-CHRCH_2-O-CH_2CHR-O_n-H \qquad (I)$$

where R is $C_1$-$C_2$ alkyl and $n$ is about 20–80, and thereafter reacting the formaldehyde-polyglycol solution with phenol in the presence of alkali. Preferred are liquid polypropyleneoxyglycols having an average molecuar weight of about 1,200–4,000. The resulting thermosetting resole adhesive resins are particularly suitable for plywood glues.

7 Claims, No Drawings

PHENOL-FORMALDEHYDE ADHESIVE RESINS CONTAINING POLY(C–C ALKYLENEOXY)GLYCOLS

BACKGROUND

This application is a continuation-in-part of application Ser. No. 100,502 filed Dec. 21, 1970 and now abandoned.

Phenolic resole resins prepared by the alkaline condensation of phenol and aldehydes have long been used in plywood adhesives. Redfern U.S. Pat. No. Re. 23,347 and Van Epps U.S. Pat. No. 2,360,376 disclose the basic technology of the alkaline condensed resole resins employed as plywood adhesives. Booty U.S. Pat. Nos. 2,462,252–3 add a water-soluble polyvinyl alcohol or methyl cellulose as a thickening agent to improve the storage stability of the adhesive resin. Lambuth U.S. Pat. No. 3,025,255 describes a liquid phenol-formaldehyde resin composition containing polyethylene glycol added after the resin cook to improve the viscosity stability.

In spite of significant advances in resin technology, changes in wood stock and production methods require adhesives tolerant to an ever wider variety of process variables. In normal plywood manufacture, wood veneers are coated with adhesive and assembled into multi-ply sheets which are held in open assembly at ambient temperature until a full press load is prepared for the hot press cure cycle, an operation that may require a half hour or more. During this open assembly time, the wood absorbs water from the adhesive glue. With a highly absorbent softwood, such as the spring wood portion of Southern yellow pine, rapid dehydration of the glue line occurs with resultant inadequate glue flow and penetration during the subsequent hot press cure. With a less absorptive wood, like Douglas fir, an aqueous glue line dries more slowly and too much flow and penetration may occur during hot pressing. Either condition causes substandard plywood.

Thus, a good plywood adhesive must be tolerant not only of the variable wood absorptivity, but must also be capable of producing specification grade plywood over a broad range of open assembly time. Other significant process variables include veneer moisture content and temperature, the temperature and humidity of the assembly area, the glue line spread, the press precure time, etc.

STATEMENT OF THE INVENTION

It has now been discovered that a plywood adhesive with increased tolerance to a wide variety of wood species and process conditions can be prepared by (A) premixing with aqueous formaldehyde about 0.3–1.5 parts per part formaldehyde of a poly($C_3$–$C_4$ alkyleneoxy) polyol of Formula I and thereafter (B) reacting the formaldehyde-polyglycol solution with phenol in the presence of alkali to obtain a thermosetting phenolformaldehyde adhesive resin.

Premixing the aqueous formaldehyde and polyglycol in the absence of alkali and phenol is critical to the improved adhesive resin. A rapid reaction of formaldehyde and the polyglycol forms a formaldehyde complex or adduct which in the subsequent base-catalyzed reaction with phenol provides a significant increase in higher molecular weight species in the adhesive resin. These higher molecular weight species are present in colloidal dispersion and appear to give the plywood glue prepared from the resole resin its improved tolerance to wood species and assembly process variations.

GENERAL DESCRIPTION

Essential to the improved resole adhesive resin is the polyglycol premixed with the formaldehyde prior to addition of phenol and caustic. Required is a poly($C_3$–$C_4$ alkyleneoxy)glycol of Formula I:

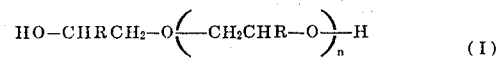

$$HO-CHRCH_2-O(-CH_2CHR-O-)_n-H \quad (I)$$

where R is $C_1$–$C_2$ alkyl and n is about 20–80. Such polyglycols have an average molecular weight of about 1,000–5,000.

Suitable polyglycols are prepared by condensation of propylene or butylene oxides, or mixtures thereof, with water or a diol initiator such as propylene glycol, 1,4-butanediol, etc., as described, for example, in Pruitt & Rogers U.S. Pat. No. 2,831,034. Commercial polyglycols have an average molecular weight ranging from 200–20,000 or more. However, the improved phenol-formaldehyde resins require a polyol with an average molecular weight of about 1,000–5,000. Particularly effective are polypropyleneoxyglycols having an average molecular weight of about 1,200–4,000.

In practice, about 0.3–1.5 parts per part formaldehyde of the poly($C_3$–$C_4$ alkyleneoxy)glycol based on formaldehyde is premixed with aqueous 30–60 percent formaldehyde. Formation of the formaldehyde-polyglycol complex or adduct occurs rapidly at room temperature. As soon as the polyglycol is dissolved or thoroughly dispersed, the mixture can be used to prepare the resole adhesive.

While 30–60 percent aqueous formaldehyde is most suitable, other formaldehyde sources including paraformaldehyde can be used provided the polyol and formaldehyde are mixed together in aqueous solution prior to addition of phenol and alkali. As in conventional resole adhesives, phenol is generally used alone. However, mixtures with up to about 20 weight percent of other phenols including cresol, xylenol, and polyphenylphenol can be used.

The improved resole adhesive resin is obtained by reacting the premixed formaldehyde-polyglycol solution with phenol in the presence of alkali in the normal manner for phenol-formaldehyde resole adhesive resins. Thus, the improved resin is prepared by using reactant mole ratios of formaldehyde/alkali/phenol of about 1.5–2.5/0.1–0.7/1.0 and cooking in a conventional manner at an elevated temperature, preferably about 70°–100°C, until an adhesive resin of desired viscosity is obtained. The alkali, preferably a strong base such as sodium or potassium hydroxide, is advantageously added in two or more increments at predetermined reaction stages. Particularly good results are obtained using the general procedure of Booty U.S. Pat. No. 2,462,253 with about 1.7–2.0 moles of formaldehyde per mole phenol.

The resulting improved thermosetting phenolformaldehyde adhesive resin can be formulated into a plywood glue mixture using standard procedures. Finely divided, inert fillers such as slate flour, wood flour, starch, clay, chalk, silicates, oat hulls, corn cobs, etc.

are normally added along with a small amount of antifoam agent, such as diesel oil, and sufficient water to give a spreadable liquid glue formulation containing about 20–50 weight percent of the improved phenol-formaldehyde adhesive resin and about 35–65 weight percent total solids. This glue can be applied to wood veneers by standard glue coating techniques using a spreader, felt roll, curtain coater, or even spray coating techniques. With the improved phenol-formaldehyde adhesive resins, excellent wood adhesion is achieved at spread rates of about 50–90 lbs/Mft$^2$ of double glue line. The optimum glue line spread depends on the specific veneer. With Douglas fir a spread of about 60–65 lbs/Mft$^2$ is excellent, while Southern white pine requires about 65–70 lbs/Mft$^2$ for best results.

The following examples illustrate further the present invention. Unless otherwise stated, all parts and percentages are by weight.

EXAMPLE 1

Phenol-Formaldehyde Adhesive Resins

A. The following standard resole resin formula and procedure was used to prepare a series of phenolformaldehyde adhesive resins by the incremental caustic addition process of Booty U.S. Pat. No. 2,462,253. Resin advancement at the end of each stage was measured using standard Gardner-Holdt bubble tubes at 25°C (ASTM Method D–1545–63). The final resole resin contains 40.0 wt. % resin solids.

Formula

| | | |
|---|---|---|
| 46.5% Formaldehyde[c] | 348.7 pts. | (5.40 moles)[a] |
| Polyglycol | 100.0 pts.[b] | |
| 90.0% Phenol[c] | 313.1 pts. | (3.00 moles)[a] |
| First Water | 48.7 pts. | |
| First 50% NaOH[c] | 25.4 pts. | (0.32 mole)[a] |
| Antifoam[d] | 0.2 pts. | |
| Second 50% NaOH[c] | 9.0 pts. | (0.11 mole)[a] |
| Second Water | 112.3 pts. | |
| Third 50% NaOH[c] | 42.6 pts. | (0.53 mole)[a] |
| | 1000.0 pts. | | a. Mole Ratios: 1.80 HCHO/0.32 NaOH/1.0 Phenol
b. 0.6 part/part HCHO
c. Adjusted for actual concentration in first or second water addition.
d. Tret-O-Lite Antifoam (Petrolite Corp., St. Louis, Mo.).

A. Control Resin without Added Polyglycol

1. The formaldehyde, phenol, and first water, increased to 98.7 parts in the absence of added polyglycol, were mixed and the temperature adjusted to 25°C. Then the first NaOH was added and the temperature increased to 85°C at a uniform rate in 100 minutes. Then the antifoam was added and the mixture held at 85°C for about 110 minutes to a Stage 1 viscosity of I (about 225 cs) determined at 25°C.

2. The resin mixture was cooled to 80°C and held at 80°C for about 80 minutes to a Stage 2 viscosity of X (about 1,290 cs).

3. The second NaOH was added and reaction at 80°C continued for about another 65 minutes to a Stage 3 viscosity of $Z_5Z_6$ (about 12350 cs).

4. The second water, increased to 169.3 parts and third NaOH were added and the resin mixture held at 80°C for about another 50 minutes before cooling rapidly to room temperature, Stage 4 viscosity of Z (about 2270 cs). This resole resin contained about 40 percent total solids.

B. Resins with Polyglycols Added to Formaldehyde

To 348.7 parts of 46.5 percent formaldehyde was added 100 parts of a commercial polypropylene glycol having an average molecular weight of 1,200. The mixture was stirred briefly at room temperature to obtain complete dissolution. Then the phenol and first water were added and the temperature adjusted to 25°C as in Example 1A. The first NaOH was added and the resole resin adhesive preparation was completed using the multistep addition, temperature and cook schedule of 1A.

Similar resins were prepared using a series of polypropylene glycols and polyethylene glycols of different molecular weight.

EXAMPLE 2

GPC Analysis of Resole Resins

Resole resin samples were freeze-dried and then dissolved in dimethylformamide as 1 wt. % solutions for gel permeation chromatography (GPC). A $10^4$ A. "-Styrogel" column (Water's Associates, Framingham, Mass.) was used to obtain a molecular weight profile of the resin. This column excludes species with a molecular weight greater than 1,300 (very high) and strongly absorbs species with a molecular weight below about 400. The molecular weight profile of the excluded and eluted species is conveniently reported by the weight ratios of high and low molecular weight species.

EXAMPLE 3

Adhesive Resin Performance

A. Comparative performance of the phenol-formaldehyde resole adhesive resins of Example 1 were evaluated using ASTM Method D 903–49 (1965) for determining the peel strength of the cured adhesive bond using standard test specimens with a flexible strip bonded to a rigid member of each test specimen. An open assembly time tolerance is measured by the peel strength achieved after curing at 150°C for 5 minutes following a predetermined open assembly time. The cure time at 150°C required to reach a peel strength of 2.5 lbs/inch width is an indication of the curing rate of the adhesive resin.

B. Typical results on open assembly time (OAT) and cure rate of the polyglycol-modified adhesive resins of Example 1B are given in Table 1. The superior performance of the polypropyleneoxyglycols of MW about 1,200–4,000 is apparent.

TABLE 1

Peel Test Open Assembly Time and Cure Rate

| Test | Polyglycol[a] | Resin Visc.[b] | GPC (Hi/Low)[c] | 5 Min. OAT[d] | Cure Time[e] |
|---|---|---|---|---|---|
| 1-1 | None | YZ | 0.35 | 1.0 | 4–5 |
| 1-2 | E-200 | $ZZ_1$ | 1.5 | 0.45 | 6 |
| 1-3 | E-2000 | Z | 1.4 | 0.45 | 15 |
| 1-4 | E-6000 | Z | 1.3 | 0.35 | 17 |
| 1-5 | E-9000 | Z | 0.5 | 0.30 | 15 |
| 1-6 | E-20,000 | Z | 0.2 | 0.55 | 17 |
| 1-7 | P-400 | $ZZ_1$ | 2.6 | 0.60 | 6 |
| 1-8 | P-1200 | $Z_1$ | 2.0 | 3.5 | 4 |
| 1-9 | P-2000 | $Z_1Z_2$ | 2.4 | 4.1 | 3 |
| 1-10 | P-4000 | Z | 1.7 | 3.5 | 2.5 | a. E-Polyethyleneoxyglycol; P-Polypropyleneoxyglycol; The number designates average MW.
b. Final Gardner-Holdt resin viscosity.
c. GPC elution ratio by the method of Example 2.
d. 5 Minute open assembly time.

e. Cure time at 150°C to reach 2.5 lbs./in. width peel strength.

EXAMPLE 4

Plywood Bond Test

The P-4000 containing adhesive resin of Test 1-10 was used in a standard Southern pine adhesive glue formulation containing 62.9 wt. percent resin to prepare three-ply ⅜ inch random Southern pine panels from stock veneer containing 4.7 percent moisture. The assembled ⅜ inch plywood panels were held in closed assembly for 15 minutes, then pressed two per opening at 140°C (285°F) and 200 psi for 9 minutes, and then hot stacked overnight. Standard shear chips were cut and subjected to the vacuum pressure treatment specified by the American Plywood Association (Par. 4.4.2 PS 1-66, US Product Standard for Softwood Plywood). Test results are expressed as break strength and percent wood failure, a high percent wood failure indicating superior glue line strength.

Typical test results given in Table 2 show the improved performance of the improved adhesive resin containing cooked-in P-4000, particularly at lower press times.

TABLE 2

Press Time Series — Southern Pine V-P Panels
Pressed 2 ppo at 285°F and 200 psi after 15 min. closed assembly

| Test | | 6.5 Min. psi-% WF | 7 Min. psi-% WF | 7.5 Min. psi-% WF | 8 Min. psi-% WF |
|---|---|---|---|---|---|
| 4-1 | Control | 127–41% | 187–76% | 195–76% | 191–92% |
| 4-2 | P-4000 | 138–54% | 201–91% | 215–79% | 204–86% |

We claim:

1. In a process for preparing a thermosetting phenol-formaldehyde adhesive resole resin by reaction of phenol and formaldehyde in the presence of alkali, the improvement which comprises:

A. Premixing with aqueous formaldehyde in the absence of alkali and phenol about 0.3-1.5 parts per part formaldehyde of a poly($C_3$-$C_4$ alkyleneoxy)glycol of Formula I:

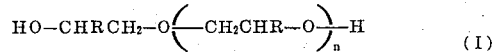

where R is $C_1$-$C_2$ alkyl and $n$ is about 20–80; and thereafter

B. Reacting the formaldehyde-polyglycol solution with phenol in the presence of alkali to obtain a thermosetting phenol-formaldehyde adhesive resin.

2. The process of claim 1 where the polyglycol is a polypropyleneoxyglycol.

3. The process of claim 1 where the polyglycol is a polypropyleneoxyglycol with an average molecular weight of about 1,200–4,000.

4. The process of claim 1 where the formaldehyde-polyglycol solution is reacted with phenol and alkali in a ratio of about 1.5–2.5 moles formaldehyde and about 0.1–0.7 mole alkali per mole phenol.

5. The process of claim 4 where the formaldehyde-polyglycol solution is reacted with phenol in the presence of sodium hydroxide at about 70°–100°C in a ratio of about 1.7–2.0 moles formaldehyde per mole phenol.

6. A thermosetting phenol-formaldehyde adhesive resole resin prepared by the process of claim 1.

7. An adhesive glue suitable for plywood manufacture containing as the adhesive resin a thermosetting phenol-formaldehyde adhesive resole resin prepared by the process of claim 1.

* * * * *